Nov. 8, 1966  R. J. HOLTON  3,283,639
SELF-THREADING FASTENER

Filed June 4, 1964  5 Sheets-Sheet 1

INVENTOR.
ROBERT J. HOLTON
BY
Jeare, Fetzer & Jeare
ATTORNEYS

Nov. 8, 1966  R. J. HOLTON  3,283,639
SELF-THREADING FASTENER
Filed June 4, 1964  5 Sheets-Sheet 3
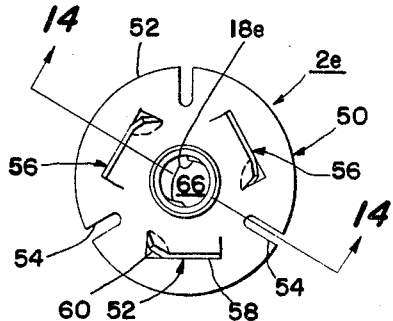
Fig. 12
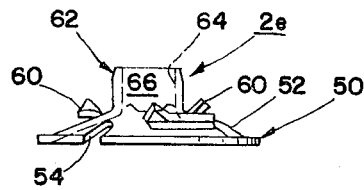
Fig. 13
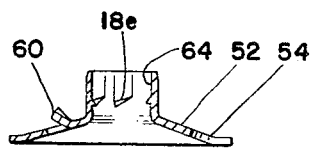
Fig. 14
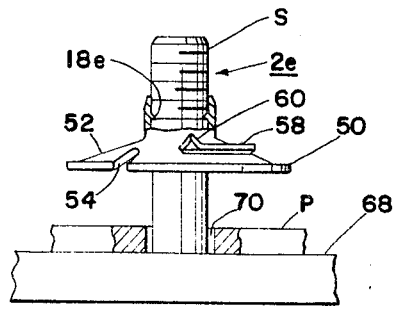
Fig. 15
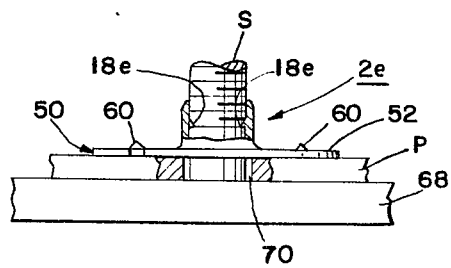
Fig. 16
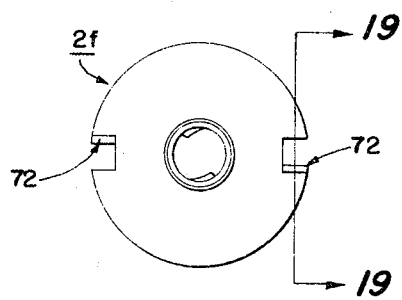
Fig. 17
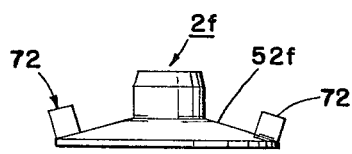
Fig. 18
Fig. 19
INVENTOR.
ROBERT J. HOLTON
BY Teare Tietzer & Teare
ATTORNEYS Nov. 8, 1966　　　　　　　　R. J. HOLTON　　　　　　　　3,283,639
　　　　　　　　　　　　SELF-THREADING FASTENER Filed June 4, 1964　　　　　　　　　　　　　　　　5 Sheets-Sheet 5

*INVENTOR.*
ROBERT J. HOLTON
BY
*Jeane, Hotyes & Jeane*
ATTORNEYS

United States Patent Office 3,283,639
Patented Nov. 8, 1966

3,283,639
SELF-THREADING FASTENER
Robert J. Holton, Cleveland, Ohio, assignor to Tinnerman Products, Inc., Cleveland, Ohio., a corporation of Ohio
Filed June 4, 1964, Ser. No. 372,478
10 Claims. (Cl. 85—32)

This invention relates in general to fastening devices and more particularly to an improved self-threading construction for a fastener device adapted for assembly with threadless studs, rods, shafts or the like, or with threadless tubular products, apertured support members or like objects.

Heretofore, many types of threaded as well as non-threaded fasteners have been useful for a great variety of applications, for instance in the assembly onto plain (threadless) studs to retain an object on a support member, such as a panel. Prior threaded fasteners which cut their own threads on a plain (threadless) stud have been proposed, but due to the hardness of the stud material, such as those comprised of die-cast or plated metal, the expansive force on the fastener has heretofore imparted considerable wear to the threads resulting in irregularities in the thread pitch with consequent loose threading between the parts. Hence, for many applications, due to space limitations and size requirements imposed by a particular application, such heretofore known threaded fasteners are not only expensive to produce, but are operationally inefficient.

In other instances, where non-threaded fasteners have been proposed they are generally formed to include a stud-receiving opening defined in various modifications to include bent edges, inclined tongues, or flexible finger-like elements arranged to cut into the outer peripheral surface of the stud. Though such types of fastener arrangements have been suitable for some purposes, it has been found that such arrangements are not satisfactory for many environmental applications. Even more than with the threaded-type fastener, the severe expansive forces on the fastener cause wide variation in inclination between the tongue or finger elements which produces substantial irregularities in pitch between adjacent cut threads with consequent loose threading between the parts. Furthermore, such heretofore known arrangements are not susceptible of effectively guiding the fastener onto the stud which condition not only results in misalignment and/or cocking between the parts during assembly, but in addition, makes it especially difficult to remove and/or reuse the fastener for subsequent applications.

Accordingly, an object of the present invention is to provide an improved fastener device formed from sheet metal or the like which is of a simple, yet rugged construction and which can be easily and economically produced.

A further object of the present invention is to provide a unitary, metal, fastener device of improved construction which can be inserted onto a threadless stud or the like; or into a threadless opening in a tubular structure or support member, and which includes self-threading means thereon capable of providing a tight fitting threading engagement onto the threadless stud or within the threadless opening in the tubular structure or support member.

A further object of the present invention is to provide an improved fastening device of the character described which can quickly and easily be applied to a threadless stud or the like; or within a threadless opening in the tubular structure or support member without misalignment and/or cocking of the fastener and which can easily be removed therefrom and reused without damage or distortion thereto and with a minimum of effort.

Other objects and advantages of the invention will be apparent from the following description taken in conjunction with the accompanying drawings, wherein:

FIG. 5 is a view in elevation, partly in section of the fastening device as assembled in tight fitting self-threading engagement onto the end of the stud or the like;

FIG. 8 is a view in elevation, partly in section of still another modified form of the fastening device as assembled in threaded engagement with a threaded opening in a support member, such as a panel, and in tight fitting self-threading engagement onto the ends of the threadless stud or the like;

FIG. 12 is a top plan view of another modified form of a fastening device made in accordance with the present invention;

FIG. 13 is an elevation view of a fastening device of FIG. 12;

FIG. 14 is a cross-section taken along the plane indicated by the line 14—14 of FIG. 12;

FIG. 15 is a view in elevation, partly in section of the fastening device of FIGS. 12 to 14 as initially assembled in tight fitting, self-threading engagement with the ends of a threadless stud or the like;

FIG. 16 is a view in elevation, partly in section of the fastening device as assembled in tight fitting self-threading engagement with the threadless studs of FIG. 15, and illustrating the fastening device in final assembled position for securing an object in tight abutting engagement against a support member, such as a panel;

FIG. 17 is a top plan view of another modified form of the fastening device made in accordance with the present invention;

FIG. 18 is an elevational view of the fastening device of FIG. 17;

FIG. 19 is a cross-section taken along the plane indicated by the line 19—19 of FIG. 17;

Generally, to the accomplishment of the aforementioned objects and other advantages which will become apparent herein, the fastening device in one of several modified forms comprises a base or web having a stud-receiving opening disposed generally centrally thereof. A hub projects from the web and generally coaxially relative to the rotational axis of the fastener. The hub includes a peripherally continuous side wall and/or end wall to provide a stud-receiving opening therethrough adapted to receive a stud therein or for insertion of the hub into an opening in a support member. The side wall of the hub is preferably provided with at least one pair of oppositely disposed thread-cutting projections disposed circumferentially interiorly and/or exteriorly on the side wall of the hub for thread-cutting engagement onto a threadless stud and/or within a threadless opening in the support member. The projections are axially and radially constructed and arranged to provide substantially increased strength and thread-cutting characteristics as the fastener is turned onto the stud and/or within the opening in the support member.

In another embodiment, the side wall of the hub may be threaded interiorly and provided exteriorly thereof with the aforementioned type of thread-cutting projections for threaded engagement onto a threaded stud and for thread-cutting engagement within a threadless opening in a support member; or alternatively, the side wall of the hub may be threaded exteriorly and provided interiorly with the aforementioned type of thread-cutting projections for threaded engagement within a threaded opening in a support member and for thread-cutting engagement onto a threadless stud or the like.

In such embodiments, the web may be provided with flexible means extending therefrom adapted for turning coaction with engaging portions of a tool or the like to facilitate installation and/or removal of the fastening device from its assembled position on a stud and/or from an opening in a support member.

Figure 1:
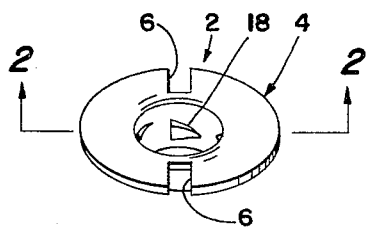
FIG. 1 is a generally perspective view of the improved fastener device made in accordance with the present invention.

Referring now again to the drawings, in FIG. 1 there is illustrated in one form of the invention a fastening device, designated generally at 2, made from a blank of suitable material, such as sheet metal, which has been transformed into the shape illustrated. In the embodiment shown, the fastener comprises a circular, generally planar web 4 having a pair of oppositely disposed slots 6 extending radially therefrom to provide an abutment for a suitable tool, whereby turning pressure may be applied to the fastener.

Figure 2:
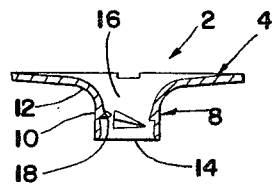
FIG. 2 is a cross-sectional view taken along the plane indicated by the line 2—2 of FIG. 1.

As best shown in FIG. 2, a seamless hub, designated generally at 8, may be drawn downwardly from the web 4 and coaxially relative to the rotational axis of the fastener. The hub is defined by a peripherally-continuous generally vertical side wall 10 which curves smoothly at one end into the web 4, as at 12, and which is open at its other end, as at 14, to provide an axially extending stud-receiving passageway 16. The passageway 16 preferably has a greater transverse dimension than the transverse dimension of the stud to minimize misalignment or cocking of the fastener relative to the stud, as will hereinafter be more fully described.

The hub is preferably provided with a pulrality of self-threading means in the form of generally arcuate projections, shown generally at 18. The projections in the embodiment shown are oppositely disposed and circumferentially spaced on the interior of the side wall 10 and generally radially of the stud-receiving passageway 16. The projections are preferably formed by shaving or displacing the material of the side wall 10, as indicated at 20, by means of a suitable tool. Such deformation functions to progressively work-harden the material which provides the projections with substantially increased hardness relative to the material of the fastener itself, thereby to achieve maximum thread-cutting engagement with the surface of a stud or the like.

Figure 3:
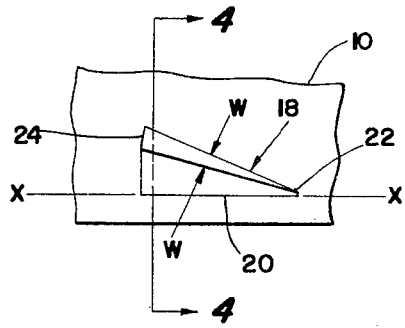
FIG. 3 is an enlarged fragmentary view illustrating in greater detail the self-threading means made in accordance with the present invention.
Figure 4:
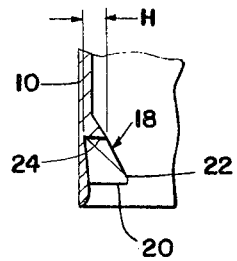
FIG. 4 is a fragmentary vertical section view on an enlarged scale taken along the plane indicated by the line 4—4 of FIG. 3.
Figure 5:
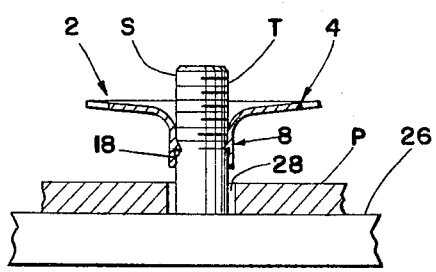

As best illustrated in FIGS. 3 and 4, each of the respective projections 18 commences at a leading end 22 and extends circumferentially, but angularly upwardly relative to the general plane of the web 4, as indicated by the line X—X, toward a trailing end 24. Axially considered, each projection preferably increases in thickness or width W—W from the leading end 22 to the trailing end 24. Hence, radially considered, each projection progressively increases in depth or height H—H from the leading end 22, which end is disposed substantially in the general plane of the side wall 10, to the trailing end 24 so that the transverse dimension between opposed projections at the leading ends 22 thereof is slightly greater than the transverse dimension of the stud to which it may be applied; but with such transverse dimension being progressively diminished toward the opposed trailing ends 24 so that at the trailing ends, the transverse dimension therebetween is slightly less than the transverse dimension of the stud. This axial and radial construction provides the respective projections with optimum strength characteristics progressively from a nominal amount at the leading ends to a maximum amount at the trailing ends so that the projections readily function to displace metal, thereby cutting uniform, helical, double-threads in the outer surface of the stud and with a minimum of torque and/or expansive pressure directed to the fastener itself.

In a typical application, the fastener device illustrated in FIGS. 1 to 5, may be assembled onto a plain (threadless stud S which projects from an article 26, such as a plate, and through an opening 28 in a support member P, such as a panel, for mounting the plate on the panel. In assembly, the fastener is inserted downwardly and simultaneously rotated onto the end of the stud S. As the fastener is turned down, the projections 18 progressively cut into the outer surface of the stud to displace metal therefrom and to form generally helical, double-threads T axially along the length of the stud. The angular disposition in conjunction with the axial and radial construction of the projections 18 greatly increases the cutting efficiency so as to cut deep and uniform threads into the stud; and also substantially increases the strength characteristics from the leading to trailing ends thereof to minimize the high expansive pressure of the fastener which results from the displacement of metal from the stud. As the fastener is drawn down on the stud, the axial dimension of the hub 8 greatly adds to the support of the projections 18 for thread-cutting engagement against the stud and insures that the fastener will not be misaligned or cocked relative to the stud during threading. Continued rotation of the fastener thereafter draws the web 4 resiliently down into generally co-planar relation against the plate 26 for positively locking the same on the panel P.

Figure 6:
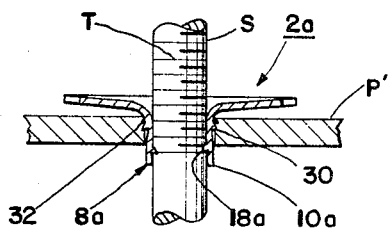
FIG. 6 is a view in elevation, partly in section of a modified form of the fastener device as assembled in tight fitting self-threading engagement within the threadless opening in a support member, such as a panel.
Figure 7:
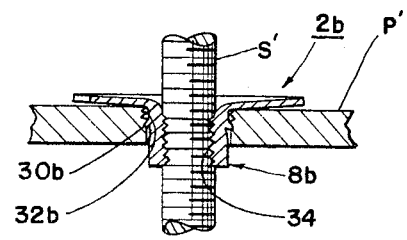
FIG. 7 is a view in elevation partly in section of another modified form of the fastening device as assembled in threaded engagement with a threaded stud or the like, and in tight fitting self-threading engagement within a threading engagement within a threadless opening in a support member, such as a panel.
Figure 8:
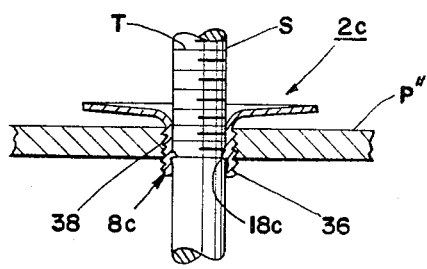

In FIGS. 6 to 8, inclusive, there are illustrated other similar applications of the fastening device. The fastener of FIG. 6, designated generally at 2a, is generally similar to that shown in FIGS. 1 to 5, except that in the embodiment shown, the hub 8a, in addition to the interior projections 18a, is preferably provided with a plurality of similarly constructed and arranged projections 30 disposed on the exterior of the side wall 10a. Moreover, in this form, upon assembly with a plain (threadless) stud S, the interior projections 18a progressively cut double-threads T on the surface of the stud while the exterior projections 30 cut corresponding double-threads, as at 32, in the confronting marginal edges presented by a plain (threadless) opening in a support member P', such as a panel.

In FIG. 7, the fastener device, designated generally at 2b, is similar to that shown in FIG. 6, except that in this form the hub 8b in addition to being provided with exterior projections 30b is preferably internally threaded, as at 34, rather than being provided with the aforementioned interior thread-cutting projections. Accordingly, in this embodiment, the fastener is adapted for threaded engagement with a threaded stud S' rather than a plain stud while the exterior projections 30b are similarly adapted for thread-cutting engagement, as at 32b, with confronting marginal edges presented by a plain (threadless opening in a support panel P', as aforesaid.

In FIG. 8, the fastener device designated generally at 2c, is generally similar to that shown in FIG. 6, except that in addition to the hub 8c being provided with interior projections 18c and rather than being provided with exterior projections, the hub 8c is exteriorly threaded, as at 36. In assembly of this embodiment shown, the interior projections 18c progressively cut double-threads T on the outer surface of a plain (threadless) stud S while the fastener is simultaneously threaded, as at 38, into a threaded opening provided in a support panel P''.

Figure 9:
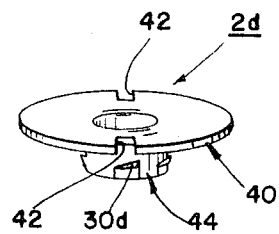
FIG. 9 is a generally perspective view showing another modified form of the fastener device in accordance with the present invention.
Figure 10:
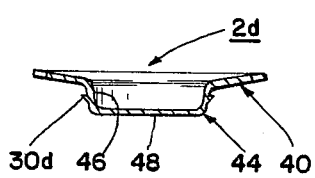
FIG. 10 is a sectional, elevational view of the fastener device of FIG. 9.
Figure 11:
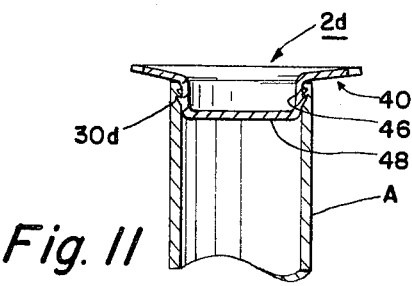
FIG. 11 is a sectional, elevational view of the fastening device of FIGS. 9 and 10 as assembled in tight fitting self-threading engagement with a threadless tubular structure.

There is shown in FIGS. 9 to 11, a generally similar fastener device, designated generally at 2d, which is particularly useful as a plug or the like for assembly with a cylindrical tubing article A, such as a pipe, conduit, hollow shafting or the like. As shown, the fastener is similarly formed from a blank of sheet or strip material and comprises a web 40 which is generally conical in cross section having radially disposed slots 42 therein for receiving a suitable tool, as aforesaid. Here again, the web 40 is drawn downwardly to provide a generally tubular hub 44 which extends coaxially relative to the rotational axis of the fastener. In this form, however, the hub 44 is defined by a peripheral-continuous, axially diverging side wall 46 which is closed across its bottom by an end wall 48 which together define a plug-like tubular construction having a lesser transverse dimension than the transverse dimension or diameter of the tubular article A with which it is to be assembled. The hub 44 is similarly provided with opposed thread-cutting projections 30d disposed on the exterior of the side wall 46 so that the transverse dimension between the respective leading and trailing portions thereof becomes progressively greater than the transverse dimension of the tubular article, as aforesaid. Hence, in application of this form, the fastening device is merely inserted into the open end of the tubular article A (FIG. 11) and simultaneously rotated therein so that the projections 30d progressively displaced metal from the inner surface of the article to provide deep, uniform double-threads therein, as aforesaid.

In FIGS. 12 to 25 there are illustrated other modified forms of the fastening device for similar applications as those illustrated in FIGS. 5 and 6 to 8. In the particular form shown in FIGS. 12 to 16, the fastener, designated generally at 2e, comprises a generally circular, in plan, base 50 formed from a blank of suitable sheet material which is drawn upwardly to provide a generally conical web 52. The base 50 and web 52 are preferably cut out to provide a plurality of radially extending slots 54 for engagement with a suitable tool, such as with engaging portions of a socket-type wrench, not shown. However, in the fastener shown, a plurality of elongated resilient fingers 56 are preferably cut or slit out of the material of the web 52 and thereafter bent angularly upwardly away from the surface of the web. The fingers 56 in the embodiment shown are symmetrically disposed intermediate the slots 54 and radially relative to the rotational axis of the fastener. Each finger preferably includes a generally planar leading end portion 58 and an upturned trailing end edge portion 60 bent angularly upwardly away from the general plane of the leading end portion 58 for turning the fastener upon engagement with the tool.

In this form, however, and as best shown in FIGS. 13 and 14, a seamless hub, designated generally at 62, is drawn upwardly from the web 52 and coaxially relative to the rotational axis of the fastener. The hub 62 is similarly defined by a peripherally-continuous generally vertical side wall 64 which provides an axially extending stud-receiving passageway 66 therethrough. The hub 62 is provided with a plurality of the aforementioned types of thread-cutting projections 18e disposed in circumferentially spaced relation on the interior side wall 64 and for the purposes, as aforesaid.

In application of this particular form, the fastening device 2e may be similarly assembled with a plain (threadless) stud S which projects upwardly from an article 68, such as a plate, and through an aperture 70 in a support member P, such as a panel, for mounting the plate on the panel. In assembly and as best shown in FIGS. 15 and 16, the fastener is turned down on the stud S by means of a tool being applied axially down over the hub 62 and into coacting turning engagement with the fingers 56 projecting from the web 52. As the fastener is turned down, the projections 18e progressively displace metal from the surface of the stud to form generally helical, double-threads thereon, as aforesaid. Continued rotation of the fastener draws the base 50 and web 52 into tight fitting co-planar relationship against the article 68 to lock the same on the panel P (FIG. 16). As the web 52 is resiliently flattened against the article, the leading end portions 58 of the fingers 56 are recessed into the surface of the web 52 with the trailing end edge portions 60 projecting angularly upwardly from such surface, thereby to facilitate removal of the fastener from locking engagement by means of the tool.

The fastener device, designated generally at 2f of FIGS. 17 to 19, is generally the same as the fastener of FIGS. 12 to 16, except for a modification incident to the construction for turning the fastener by means of a suitable tool, such as a socket-type wrench. In the embodiment shown, a pair of alternately disposed resilient wings 72 are cut or slit out of the material of the web 52f. As shown, the wings 72 each include an angularly upwardly bent portion 74 and a vertically extending portion 76 which together define a generally L-shaped configuration in cross-section, as shown in FIG. 19. In this form, the wings 72 receive turning pressure from the tool with the angularly upwardly bent portions 74 being recessed into the surface of the web upon resilient abutment of the same against an article or support panel, as aforesaid.

Figure 20:
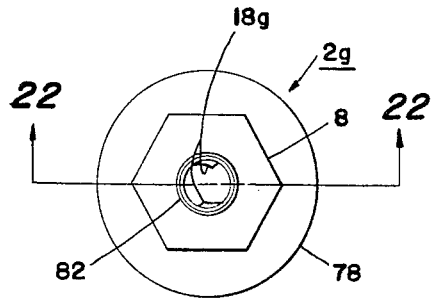
FIG. 20 is a top plan view of another modified form of the fastening device made in accordance with the present invention.
Figure 21:
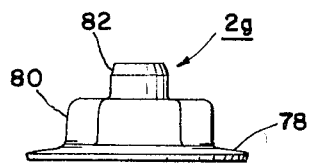
FIG. 21 is an elevational view of the fastening device of FIG. 20.
Figure 22:
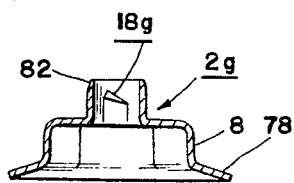
FIG. 22 is a cross-section taken along the plane indicated by the line 22—22 of FIG. 20.

The fastener device, designated generally at 2g, as shown in FIGS. 20 to 22 is generally of the same self-threading construction as that illustrated in FIGS. 12 to 19, except that the generally circular, in plan, base 78 flares angularly upwardly and merges smoothly into a polygonal, such as a hexagonal-shaped, web 80 which is drawn upwardly therefrom and coaxially relative to the rotational axis of the fastener. A seamless hub 82 is drawn upwardly from the web and coaxially relative to such axis and includes the aforementioned type of self-threading projections 18g disposed interiorly of the hub and for the purposes, as aforementioned.

Figure 23:
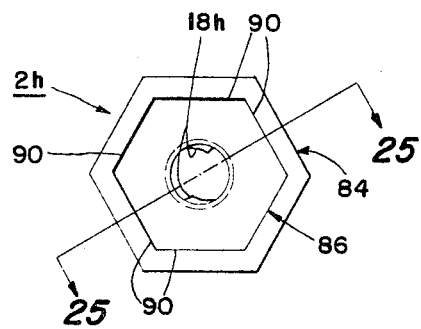
FIG. 23 is a top plan view of still another modified form of the fastening device made in accordance with the present invention.
Figure 24:
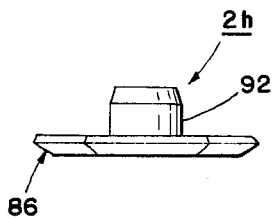
FIG. 24 is an elevational view of the fastening device of FIG. 23.
Figure 25:
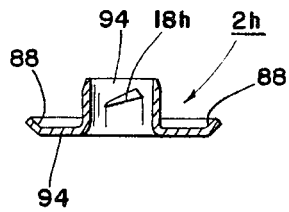
FIG. 25 is a cross-section taken along the plane indicated by the line 25—25 of FIG. 23.
Figure 26:
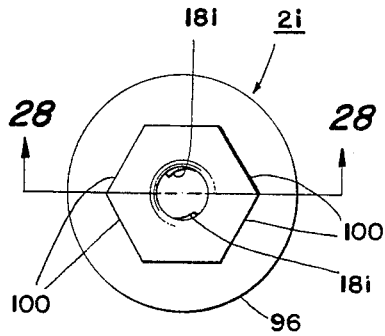
FIG. 26 is a top plan view of another modified form of the fastening device made in accordance with the present invention.
Figure 27:
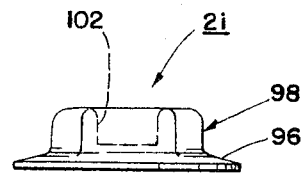
FIG. 27 is an elevational view of the fastening device of FIG. 26.
Figure 28:
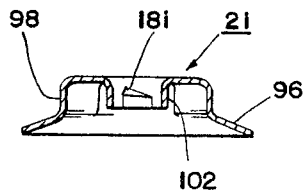
FIG. 28 is a cross-section taken along the plane indicated by the line 28—28 of FIG. 26.
Figure 29:
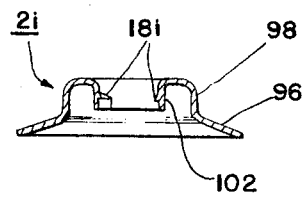
FIG. 29 is a cross sectional view and showing the fastening device of FIG. 28 rotated through and angle of 90°.

In FIGS. 23 to 25 the fastener device designated generally at 2h, is generally the same as that illustrated in FIGS. 12 to 22, except that in this form the base 84 is in the form of a seamless, polygonal, such as a hexagonal-shaped, shell 86 drawn upwardly at the peripheral edges, as at 88 (FIG. 25), to provide six tool engaging surfaces 90 spaced equi-distantly from the rotational axis of the fastener. A peripherially-continuous hub 92 is drawn upwardly from the shell 86 and coaxially relative to the rotational axis fastener to provide an axially extending stud-receiving passageway 94 threthrough. Here again, the hub 92 includes a plurality of thread-cutting projections 18$h$ circumferentially spaced interiorly of the hub and for the purposes, as aforementioned.

In FIGS. 26 to 29 the fastener designated generally at 2$i$, is generally similar to that illustrated in FIGS. 20 to 22, and includes a generally conical base 96 which flares angularly upwardly and merges smoothly into a polygonal, such as a hexagonal-shaped, web 98 which is drawn upwardly therefrom and coaxially relative to the rotational axis of the fastener. Here again, the web 98 defines six tool engaging surfaces 100 spaced equi-distantly from the rotational axis of the fastener. In this form of the fastener, however, the peripherially-continuous hub 102 is drawn downwardly in concentric relation within the web 98 and coaxially relative to the rotational axis of the fastener. Hence, in this form, the concentric interiorly disposed hub 102 is provided with the aforementioned type of interior thread-cutting projections 18$i$ and for the purposes, as aforesaid.

Accordingly, in the embodiment illustrated, it can be seen that the base and/or web may be of various shapes and/or constructions and that any number and/or arrangement of the self-thread cutting projections may be utilized for assembly with a threadless stud or for use as a plug for assembly with various tubular, but threadless, articles. Moreover, while in the various embodiments the fastener has been illustrated as being rotatably assembled with a stud or within a tubular article, it is contemplated herein that the stud or tubular article may just as easily be rotatably assembled with the fastener being held in stationary relation in any of the embodiments illustrated.

From the foregoing description and accompanying drawings it will be seen that the present invention provides a novel construction for a fastener device for facile assembly with a threadless and/or threaded stud, shaft or the like; or for assembly within threadless and/or threaded opening in a support member, such as a panel, tube, pipe or like article, and which includes an improved self-threading arrangement constructed from the material of the fastener itself, to positively threadably secure the fastener in such assembled relation on the stud or support member. The invention also includes an arrangement to effectively prevent misalignment or cocking between the parts and resilient means engageable by a tool to facilitate assembly with and removal from the stud or support member.

The terms and expressions which have been used are terms of description and not of limitation, and there is no intention in the use of such terms and expressions of excluding any equivalents of any of the features described or shown, or portions thereof, but it is recognized that various modifications are possible within the scope of the invention claimed.

I claim:
1. A self-threading fastening device for mounting on a stud and/or within an opening of a support member comprising, a resilient web having a stud-receiving opening disposed concentrically relative to the rotational axis of said device, a generally tubular hub extending outwardly from said web and coaxially relative to the rotational axis of said device, said hub including a peripherally-continuous side wall defining a stud-receiving passageway disposed concentrically relative to the opening in said web, at least one pair of oppositely disposed thread-cutting projections disposed in circumferentially spaced relation on said side wall and extending angularly relative to the general plane of said web, said projections being sheared from the material of said side wall, each of said projections including a leading end portion extending angularly toward a trailing end portion, said projections each having a progressively increasing radial height from said leading end portion to said trailing end portion, and having a progressively increasing axial width from said leading end portion toward said trailing end portion for cutting uniform, generally helical threads.

2. A fastening device in accordance with claim 1, wherein the projections are disposed on the interior of said side wall, the leading end portion of each projection being disposed substantially in the general surface of said side wall so that the maximum transverse distance between the leading end portion of opposed projections is generally the same as the maximum transverse dimension of said passageway, and the trailing end portion of each projection being disposed substantially above the general surface of said side wall so that the maximum transverse distance between the trailing end portions of opposed projections is less than the maximum transverse dimension of said passageway.

3. A fastening device in accordance with claim 1, wherein the projections are disposed on the exterior of said side wall, the leading end portion of each projection being disposed substantially in the general surface of said side wall so that the maximum transverse distance between the leading end portion of opposed projections is generally the same as the maximum transverse dimension of said hub, and the trailing end portion of each projection being disposed substantially above the general surface of said side wall so that the maximum transverse distance between the trailing end portions of opposed projections is substantially greater than the maximum transverse dimension of said hub.

4. A fastening device in accordance with claim 1, wherein the side wall of the hub is threaded interiorly thereof for threaded engagement with said stud, and wherein the projections are disposed in circumferentially spaced relation on the exterior surface of said side wall for thread-cutting engagement within the opening in said support member.

5. A fastening device in accordance with claim 1, wherein the side wall of said hub is threaded exteriorly thereof for threaded engagement within the opening in said support member, and wherein the projections are disposed in circumferentially spaced relation on the interior surface of said side wall for thread-cutting engagement with said stud.

6. A fastening device in accordance with claim 1, wherein at least one pair of projections are disposed on the interior surface of said side wall, and wherein at least one other pair of projections is disposed on the exterior surface of said side wall.

7. A fastening device in accordance with claim 1, including flexible means projecting upwardly from said web, said flexible means being disposed symmetrically and generally radially relative to said hub and adapted for coacting turning engagement with a tool or the like.

8. A fastening device in accordance with claim 7, wherein said flexible means includes a plurality of fingers extending angularly upwardly from the general plane of said web, each of said fingers including a leading portion adapted to be recessed into the general surface of said web, and an upturned trailing end edge portion adapted to project above the general surface of said web in the assembled position of said device.

9. A fastening device in accordance with claim 7, wherein said flexible means includes a pair of wings disposed alternately on opposed sides of said hub, each of said wings including an angularly upwardly bent portion and a generally vertically extending portion which together define a generally L-shaped configuration, in elevation.

10. A self-threading fastening device for mounting on the end of a threadless stud and/or within a threadless opening in a support member comprising, a resilient, generally conical web having a stud-receiving opening disposed concentrically relative to the rotational axis of said device, a tubular hub extending axially upwardly from said web and coaxially relative to the rotational axis of said device, said hub including a peripherally-continuous side wall defining a stud-receiving passageway disposed concentrically relative to the opening in said web, a plurality of oppositely disposed generally helical thread-cutting projections disposed in circumferentially spaced relation on said side wall, said projections being sheared generally axially from the material of said side wall, each of said projections including a leading end portion extending generally helically toward a trailing end portion, each of said projections having a progressively increasing radial height from said leading end portion to said trailing end portion, and having a progressively increasing axial width from said leading end portion to said trailing end portion for cutting uniform, generally helical threads, and a plurality of flexible finger-like elements projecting upwardly from the surface of said web adapted for coacting turning engagement with a tool or the like.

References Cited by the Examiner

UNITED STATES PATENTS

| | | |
|---|---|---|
| 1,771,522 | 7/1930 | Berge. |
| 2,095,397 | 10/1937 | Overmyer _____ 85—32 |
| 2,862,413 | 12/1958 | Knohl _____ 85—36 |
| 2,901,938 | 9/1959 | Van Buren. |
| 3,036,793 | 5/1962 | Becker _____ 85—36 |
| 3,092,162 | 6/1963 | Johnsen _____ 151—41.73 |
| 3,150,556 | 9/1964 | Churchill. |
| 3,153,972 | 10/1964 | Holton _____ 85—36 |
| 3,160,189 | 12/1964 | Hughes _____ 85—3 |

FOREIGN PATENTS 157,520    7/1954   Australia.

CARL W. TOMLIN, *Primary Examiner.*

M. PARSONS, JR., *Assistant Examiner.*